(12) United States Patent
Becker

(10) Patent No.: US 7,354,511 B2
(45) Date of Patent: Apr. 8, 2008

(54) HYDRAULIC UNIT FOR INDUSTRIAL TRUCKS

(75) Inventor: Marion Becker, Norderstedt (DE)

(73) Assignee: Jungheiurich Aktiengesellschaft, Hamburg (DE)

( * ) Notice: Subject to any disclaimer, the term of this patent is extended or adjusted under 35 U.S.C. 154(b) by 0 days.

(21) Appl. No.: 11/169,844

(22) Filed: Jun. 29, 2005

(65) Prior Publication Data
US 2006/0000757 A1 Jan. 5, 2006

(30) Foreign Application Priority Data
Jul. 3, 2004 (DE) ...................... 10 2004 032 256

(51) Int. Cl.
*B01D 35/027* (2006.01)
*F01M 11/03* (2006.01)

(52) U.S. Cl. .............. 210/167.02; 210/171; 210/172.1; 210/172.6; 210/416.5; 210/251; 60/454; 137/544; 137/546; 137/549

(58) Field of Classification Search ................ 210/168, 210/171
See application file for complete search history.

(56) References Cited

U.S. PATENT DOCUMENTS

| | | | | |
|---|---|---|---|---|
| 2,425,848 A | * | 8/1947 | Vawter | 210/167.31 |
| 2,455,271 A | * | 11/1948 | Raymond | 137/114 |
| 2,669,254 A | * | 2/1954 | Mork | 210/172.2 |
| 2,685,347 A | * | 8/1954 | Busby | 184/1.5 |
| 3,001,368 A | * | 9/1961 | Barr et al. | 60/358 |
| 3,305,137 A | * | 2/1967 | Gauthier et al. | 222/136 |
| 3,515,167 A | * | 6/1970 | Svenson | 137/565.17 |
| 3,656,621 A | * | 4/1972 | Barthe | 210/133 |
| 3,667,603 A | * | 6/1972 | Courson | 210/130 |
| 3,759,388 A | * | 9/1973 | Thomason | 210/167.28 |
| 3,934,941 A | * | 1/1976 | Holmes | 303/113.1 |
| 4,095,673 A | * | 6/1978 | Takeuchi | 184/1.5 |
| 4,256,031 A | * | 3/1981 | Ryan | 100/65 |
| 4,325,678 A | * | 4/1982 | Kanamaru et al. | 417/313 |
| 4,423,980 A | * | 1/1984 | Warnock | 404/83 |
| 4,513,614 A | * | 4/1985 | Adcock | 73/169 |
| 4,519,904 A | * | 5/1985 | Helmick | 210/167.28 |
| 4,584,916 A | * | 4/1986 | Inoue et al. | 82/19 |
| 4,623,455 A | * | 11/1986 | Adcock | 210/167.04 |
| 4,772,402 A | * | 9/1988 | Love | 210/804 |
| 4,872,997 A | * | 10/1989 | Becker | 210/703 |
| 4,991,608 A | * | 2/1991 | Schweiger | 134/56 R |
| 4,993,457 A | * | 2/1991 | Berfield | 137/899 |
| 5,035,811 A | * | 7/1991 | Grondin et al. | 210/806 |

(Continued)

FOREIGN PATENT DOCUMENTS

DE    3709477 A1 * 12/1987

(Continued)

Primary Examiner—Robert James Popovics
(74) Attorney, Agent, or Firm—Vidas, Arrett & Steinkraus, P.A.

(57) ABSTRACT

A hydraulic unit for industrial trucks, comprising a motor pump unit which is directly attached to a tank, a reflux filter which has an elongate filter casing for a filtering element adapted to be introduced into the tank through an opening, a hose coupling, and an outlet opening, wherein the filtering element is disposed in the flow path between the hose coupling and the outlet opening, a reflux hose between the motor pump unit and the hose coupling, and a closure for the reflux filter, wherein the reflux hose extends within the tank and the hose coupling is disposed within the tank.

8 Claims, 3 Drawing Sheets

U.S. PATENT DOCUMENTS

| | | | |
|---|---|---|---|
| 5,057,658 A * | 10/1991 | Cano et al. | 210/167.04 |
| 5,078,236 A * | 1/1992 | Shimoaki et al. | 187/285 |
| 5,101,885 A * | 4/1992 | Drake | 165/47 |
| 5,104,294 A * | 4/1992 | Banba | 417/36 |
| 5,104,529 A * | 4/1992 | Becker | 210/195.1 |
| 5,139,658 A * | 8/1992 | Hodge | 210/167 |
| 5,139,678 A * | 8/1992 | Frederick et al. | 210/641 |
| 5,158,677 A * | 10/1992 | Hewitt et al. | 210/202 |
| 5,174,902 A * | 12/1992 | Shubert et al. | 210/662 |
| 5,207,903 A * | 5/1993 | Giberson | 210/238 |
| 5,277,827 A * | 1/1994 | Osborne | 210/787 |
| 5,318,700 A * | 6/1994 | Dixon et al. | 210/712 |
| 5,340,471 A * | 8/1994 | Wilson et al. | 210/167.28 |
| 5,413,716 A * | 5/1995 | Osborne | 210/787 |
| 5,429,753 A * | 7/1995 | Hilgren | 210/805 |
| 5,454,937 A * | 10/1995 | Lewandowski | 210/104 |
| 5,569,389 A * | 10/1996 | Hilgren | 210/805 |
| 5,597,601 A * | 1/1997 | Griffin | 426/417 |
| 5,601,413 A * | 2/1997 | Langley et al. | 417/12 |
| 5,738,782 A * | 4/1998 | Schafer et al. | 210/171 |
| 5,772,408 A * | 6/1998 | Hada et al. | 417/313 |
| 5,772,871 A * | 6/1998 | Lyon et al. | 210/167.02 |
| 5,906,221 A * | 5/1999 | Mancell | 137/549 |
| 5,948,274 A * | 9/1999 | Lyon et al. | 210/760 |
| 6,027,658 A * | 2/2000 | Soble et al. | 210/801 |
| 6,035,930 A * | 3/2000 | Schwartz | 165/169 |
| D428,468 S * | 7/2000 | Dea et al. | D23/207 |
| 6,193,895 B1 * | 2/2001 | Dea et al. | 210/765 |
| 6,206,055 B1 * | 3/2001 | Hollub et al. | 141/98 |
| 6,207,051 B1 * | 3/2001 | Anderson et al. | 210/237 |
| 6,302,167 B1 * | 10/2001 | Hollub | 141/98 |
| 6,354,674 B1 * | 3/2002 | Iwamoto et al. | 303/119.3 |
| 6,371,005 B1 * | 4/2002 | Foschini et al. | 91/418 |
| 6,427,474 B1 * | 8/2002 | Le Boucher et al. | 62/434 |
| 6,485,634 B2 * | 11/2002 | Warren et al. | 210/85 |
| 6,596,174 B1 * | 7/2003 | Marcus | 210/695 |
| 6,615,866 B2 * | 9/2003 | Cook | 137/565.19 |
| 6,796,339 B1 * | 9/2004 | Petty | 141/65 |
| 6,978,608 B2 * | 12/2005 | Dantlgraber | 60/454 |
| D520,595 S * | 5/2006 | Johnson et al. | D23/207 |
| 7,047,733 B1 * | 5/2006 | Pecouyoul | 60/325 |
| 7,179,390 B1 * | 2/2007 | Layton | 210/767 |
| 7,281,372 B2 * | 10/2007 | Sakai et al. | 60/434 |
| 2003/0047218 A1 * | 3/2003 | Cook | 137/565.19 |
| 2004/0187488 A1 * | 9/2004 | Dantlgraber | 60/325 |
| 2006/0000757 A1 * | 1/2006 | Becker | 210/171 |
| 2007/0119789 A1 * | 5/2007 | Layton | 210/805 |

FOREIGN PATENT DOCUMENTS

| | | | |
|---|---|---|---|
| DE | 19959022 C1 * | 6/2001 | |
| DE | 100 05 777 A1 | 8/2001 | |
| DE | 203 19 203 U1 | 4/2004 | |
| JP | 58207501 A * | 12/1983 | |
| JP | 63045470 A * | 2/1988 | |
| JP | 02142907 A * | 6/1990 | |
| JP | 08232901 A * | 9/1996 | |
| JP | 10274201 A * | 10/1998 | |
| WO | WO 0181770 A1 * | 11/2001 | |

* cited by examiner

HYDRAULIC UNIT FOR INDUSTRIAL TRUCKS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

Industrial trucks are provided with a hydraulic unit to lift loads by the use of a load-carrying means. The unit comprises a driving motor, mostly an electric motor, and a pump driven by the motor as well as a valve assembly. In the simplest case, an easy-action lift cylinder is actuated with a check valve being responsible for holding the load whereas the load is lowered by releasing a return path to the tank from the valve assembly, e.g. via the unblockable check valve.

It has become known already to combine the motor, pump, and valve assembly as a unit within a common casing and to place the casing directly onto a hydraulic tank from which the pump draws in a hydraulic medium. Further, it has been known to feed the flow-back medium not straight to the tank, but route it through a so-called reflux filter during the lowering operation.

Further, it has been known to configure a reflux filter such as to introduce an elongate filter casing (a bell), which contains a filtering element, into the hydraulic tank through an opening. A hose extends from the valve assembly of the hydraulic unit to a hose coupling of the filter casing, either through the tank lid which closes the sealing of the opening or even through a lateral coupling which is formed with a casing which, in turn, is fixed to the tank above the opening. However, a reflux filter of this type has some drawbacks. Possible leaks result because of the externally located couplings of the hose between the hydraulic unit and reflux filter. Furthermore, the reflux hose requires to be disconnected to change the filter. At least two sealing rings are necessary to provide a seal between the reflux hose and the tank or filter casing. Moreover, the known reflux filter necessitates a relative large number of individual components.

It is the object of the invention to provide a hydraulic unit for industrial trucks in which the above-mentioned drawbacks are not encountered and which reduces the constructional and handling effort.

BRIEF SUMMARY OF THE INVENTION

In the invention, the reflux hose is located within the tank. A tube coupling is provided on the filter casing within the tank.

The provision of such a filtering device merely requires three components, i.e. a filter casing, a lid, and a filtering element. However, this applies only when a hose coupling socket is integrally formed with the filter casing, according to an aspect of the invention.

A further advantage is that it is unnecessary to disconnect the reflux hose for a filter change. There is merely a need to unscrew the tank lid from a threaded socket of the tank in order to remove the filtering element. If there is a leak in the area of the reflux hose, the hydraulic medium enters the tank and does not get into the surroundings. Merely a simple O-ring gasket is required to achieve a seal between the tank and filter.

BRIEF DESCRIPTION OF THE SEVERAL VIEWS OF THE DRAWINGS

The invention will be described in more detail below with reference to the embodiments shown in the drawings.

DETAILED DESCRIPTION OF THE INVENTION

Figure 1:
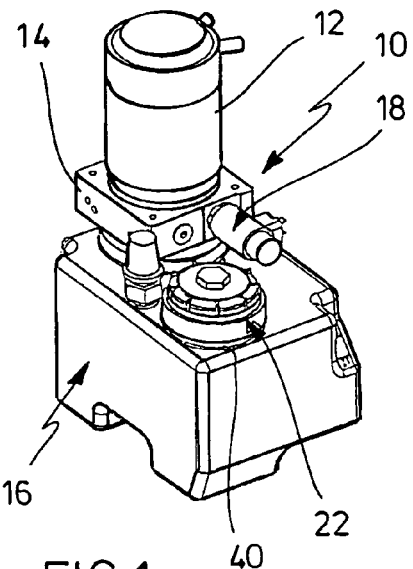
FIG. 1 shows a perspective view of a hydraulic unit of the invention.

While this invention may be embodied in many different forms, there are described in detail herein a specific preferred embodiment of the invention. This description is an exemplification of the principles of the invention and is not intended to limit the invention to the particular embodiment illustrated In FIGS. 1 to 3, a compact hydraulic unit 10 is shown with a motor pump unit 12, which have a common casing. The casing of the motor pump unit 12 has fastened thereto a valve casing 14 via which the motor pump unit 12 is mounted on the upper side of a hydraulic tank 16. A solenoid valve 18 is attached to the valve casing 14. The hydraulic unit described, for example, serves for actuating a lift cylinder in an industrial truck (not shown). When the motor of the motor pump unit 12 is turned on the hydraulic medium will be delivered to the lift cylinder from the tank 16. The valve assembly has provided therein a check valve which prevents the hydraulic medium from flowing back and maintains the lift cylinder in the position assumed. Upon actuation of the valve 18, the hydraulic medium will flow back from the lift cylinder, namely through a hose 20 which is shown in phantom lines in FIGS. 2 and 3. The hose is located within the tank 16 and leads to a filtering device 22 which will be explained in more detail with reference to FIGS. 4 and 5.

Figure 4:
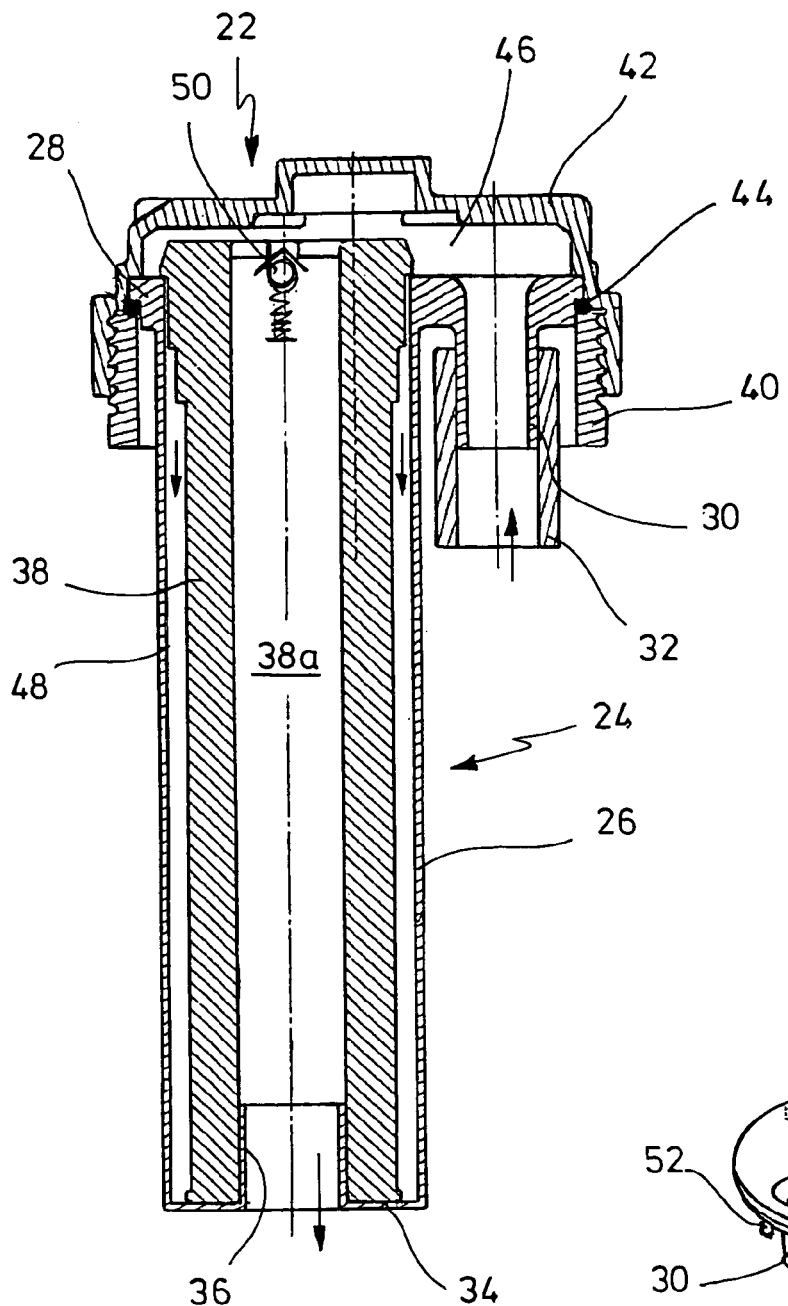
FIG. 4 shows a section through a reflux filter of the hydraulic unit of FIGS. 1 to 3.

The filtering device depicted in FIG. 4, which defines a so-called reflux filter, has a filter casing 24 which includes an elongate sleeve portion 26 at the upper end of which a radial flange 28 is formed. A couping socket 30, in turn, is formed on the flange 28. The filter casing 24 is integrally formed from a plastic material. The socket 30 allows to recognize some part of the reflux tube 20 at 32.

The sleeve portion 26 is partially closed in part at the lower end at 34, an upwardly facing annular cylindrical lug 36 being formed in the area of a central lower opening. An annular cylindrical filter cartridge 38 is located within the filter casing 24 with the central passage 38a of the filter cartridge housing the cylindrical lug 36 and the lower end of the cartridge 38 abutting on the closed bottom portion 34. The upper end of the cartridge has a diameter which is somewhat larger than the inside diameter of the sleeve portion 26.

Figure 2:
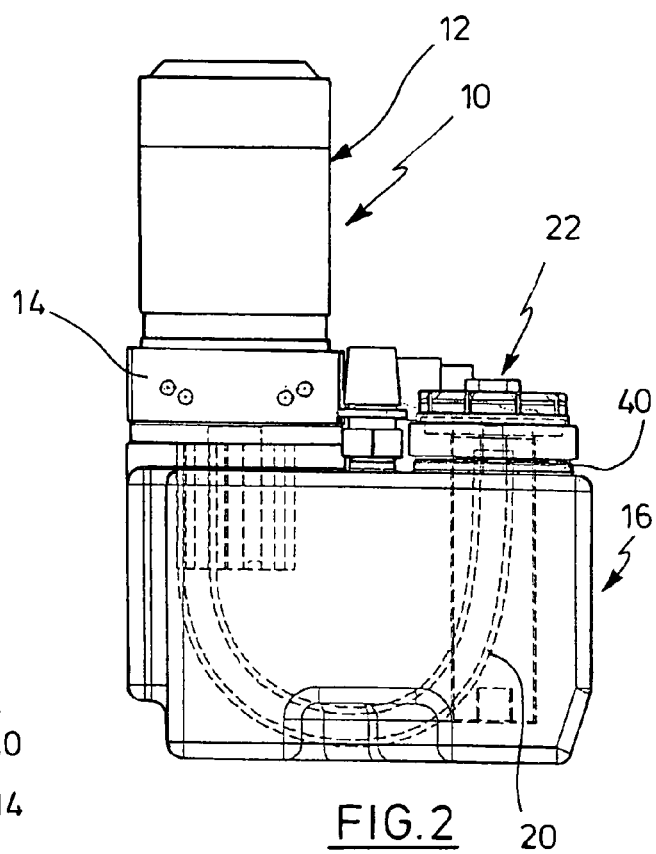
FIG. 2 shows a side view of the hydraulic unit of FIG. 1.
Figure 3:
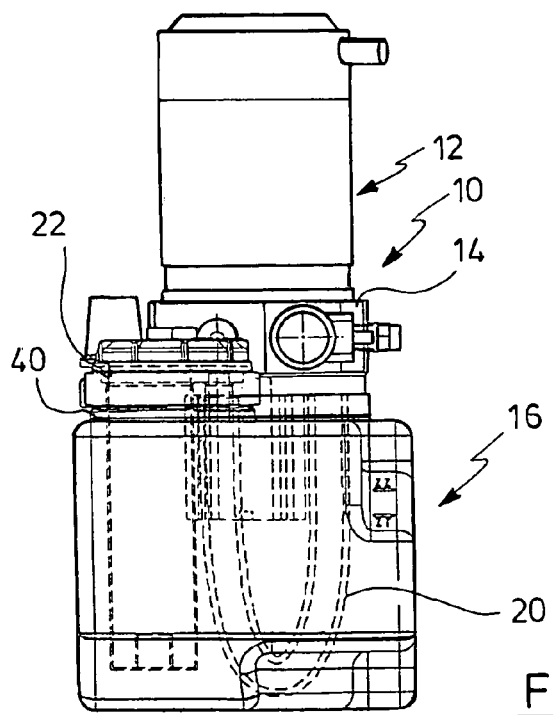
FIG. 3 shows a side view of the hydraulic unit of FIG. 1 that is offset by 90°.

FIG. 4 also allows to recognize a threaded socket 40 which is formed at the upper side of the tank 16 (also see FIGS. 1 to 3). A tank lid 42 is screwed onto the threaded socket 40, an O-ring 44 being disposed between the tank lid 42 and socket 40 or the outside of the flange 28 to bring about a seal with regard to the tank, lid, and reflux filter in this area. A space 46 is defined between the inside of the lid 42 and the upper side of the filter casing 24 or filter cartridge 38. The hydraulic medium which flows into the reflux filter 22 through the reflux hose 20 and coupling socket 30 (see the arrow) is capable of flowing through the space 46 and into the annular space 48 between the filter cartridge 38 and the inside wall of the socket portion 26 and, thence, into the passage 38a of the filter cartridge 38 (see the arrow). As can be recognized in FIG. 4 the outside diameter of the cartridge 38 is smaller than the inside diameter of the socket portion 26.

The reflux filter 22 shown in the Figures only has 3 components, i.e. the tank lid 42, the filter casing 24, and the filter cartridge 38. Therefore, its manufacture proves to involve particularly little effort. A change of the filter cartridge 38 merely makes it necessary to unscrew the tank lid 42.

If a leak should occur at the coupling points of the reflux hose 20 or the hose should become brittle as such the medium will not flow to the outside, but remain inside the tank 16.

Referring to the embodiment of FIG. 1, it should be added that the passage 38a, at its upper end, is blocked by a check valve 50 from the space 46. The valve solely opens at a predetermined pressure in the space 46. The oil will then flow back to the tank in a non-filtered condition.

Figure 5:
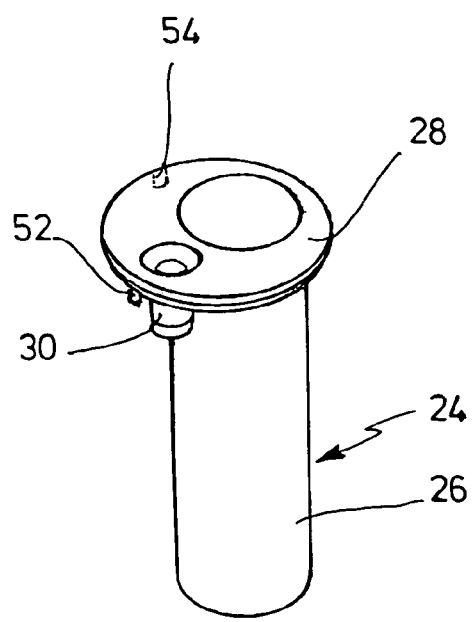
FIG. 5 shows a perspective view of the filter casing of the reflux filter of FIG. 4.

Referring to FIG. 5, it should be mentioned that the underside of the radial flange 28 has formed thereon two projections 52, 54 which interact with matching recesses (not shown) of the threaded socket 28. This helps achieve that the casing 24, when in a predetermined rotational position, be inserted into the socket 28 and, hence, the tank 16.

Figure 6:
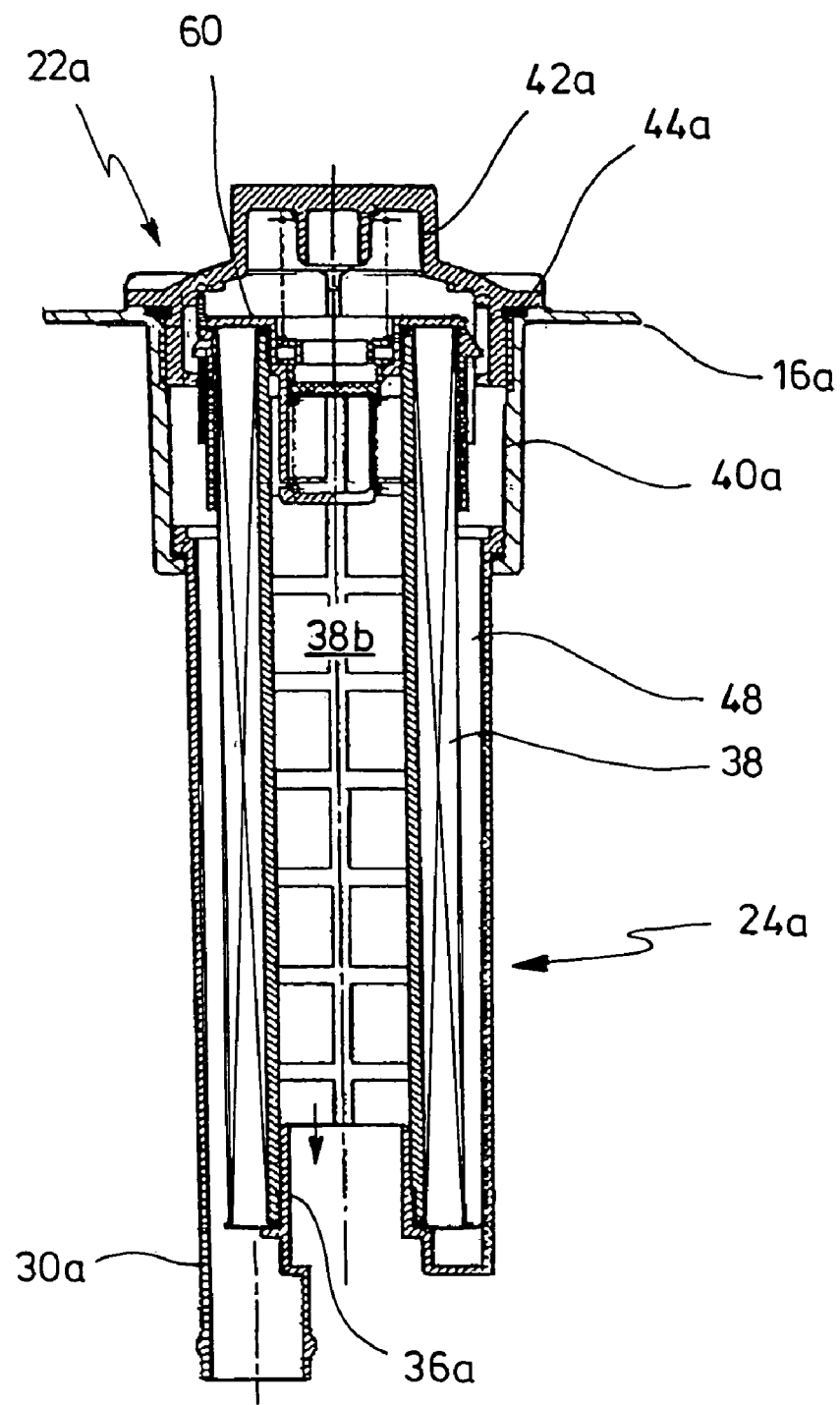
FIG. 6 shows a section through another embodiment of a reflux filter.

In an alternative embodiment of FIG. 6, components like those of the embodiment of FIG. 4 are given like reference numbers to which an index "a" is added. Identical components are not denoted with an additional index.

It can be appreciated in FIG. 6 that a coupling socket 30a is configured for a hose, which is not shown, at the lower end of the sleeve-like filter casing 24a. The oil flowing back through the hose gets into the space 48 between the filter cartridge 38 and the associated inside wall of the casing 24a and, thence, flows into the passage 38b through the filter cartridge and, thence, flows downwards again as is shown by the arrows shown in the drawing.

It is also conceivable to form the hose coupling socket laterally to the wall of the casing 24a.

In FIG. 6, a socket 40a is passed into the interior of the tank 18a. It has a female thread to receive the male thread of the lid 42a. The socket 40a has a radially inwardly directed flange at the lower end onto which a radial flange of the casing 24a is deposited. The upper end of the filter casing 24a has positioned thereon a closure 60 which closes the passage 38b and filter cartridge 38 towards the top. It can be provided with a throttle opening or a valve, which is not shown in detail, in the area of the passage 38b to correspond to the action of the valve 50 of FIG. 4.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A hydraulic unit for industrial trucks, comprising:
a tank;
a motor pump unit attached to the tank by a valve casing;
a reflux filter which has an elongate filter casing for a filtering element, the reflux filter being arranged inside the tank through an opening in the tank;
the reflux filter having a hose coupling inlet and an outlet opening;
a reflux hose (20) extending between the valve casing of the motor pump unit and the hose coupling inlet, the reflux hose and the hose coupling inlet being located within the tank;
wherein the filtering element of the reflux filter is disposed in the flow path between the hose coupling and the outlet opening;
whereby the reflux hose and the hose coupling inlet are both disposed within the tank.

2. The hydraulic unit according to claim 1, characterized in that the opening in the tank is adapted to be closed by a tank lid (42, 42a), the end of the filter casing (24) that faces the lid has a radial enlargement (28) to which the hose coupling is formed, and the tank lid (42) is adapted to be screwed onto the threaded socket (40) of the tank (16) such as to form a space (46) which connects the interior of the filter casing (24) to the hose coupling (32), between the end of the filter casing (24) that faces the tank lid and the tank lid (42).

3. The hydraulic unit according to claim 1, characterized in that the hose coupling (30) is provided at the end of the filter casing (24) that faces the interior of the tank (16a).

4. The hydraulic unit according to claim 1, characterized in that the filter casing (24) and hose coupling (30, 30a) are integrally formed from a plastic.

5. The hydraulic unit according to claim 1, characterized in that a sealing ring (44) is disposed between the tank lid (42) and a circular circumferential portion of the filter casing (24) and the free end of a threaded socket (40).

6. The hydraulic unit according to claim 1, characterized in that projections (52, 54) are provided on the filter casing (24) which interact with recesses or projections of the opening of the tank for a predetermined rotational position of the filter casing (24).

7. A hydraulic unit for industrial trucks, comprising:
a tank;
a motor pump unit attached to the tank by a valve casing;
a reflux filter which has an elongate filter casing for a filtering element, the reflux filter being arranged inside the tank through an opening in the tank;
the reflux filter having a hose coupling inlet and an outlet opening;
a reflux hose (20) extending between the valve casing of the motor pump unit and the hose coupling inlet, the reflux hose and the hose coupling inlet being located within the tank;
wherein the filtering element of the reflux filter is disposed in the flow path between the hose coupling and the outlet opening;
whereby the reflux hose and the hose coupling inlet are both disposed within the tank; and
whereby the opening in the tank is adapted to be closed by a tank lid (42, 42a), the end of the filter casing (24) that faces the lid has a radial enlargement (28) to which the hose coupling is formed, and the tank lid (42) is adapted to be screwed onto the threaded socket (40) of the tank (16) such as to form a space (46) which connects the interior of the filter casing (24) to the hose coupling (32), between the end of the filter casing (24) that faces the tank lid and the tank lid (42).

8. A hydraulic unit for industrial trucks, comprising:
a tank;
a motor pump unit attached to the tank by a valve casing;
a reflux filter which has an elongate filter casing for a filtering element, the reflux filter being arranged inside the tank through an opening in the tank;
the reflux filter having a hose coupling inlet and an outlet opening;
a reflux hose (20) extending between the valve casing of the motor pump unit and the hose coupling inlet, the reflux hose and the hose coupling inlet being located within the tank;
wherein the filtering element of the reflux filter is disposed in the flow path between the hose coupling and the outlet opening;
whereby the reflux hose and the hose coupling inlet are both disposed within the tank; and
whereby the filter casing (24) and hose coupling (30, 30a) are integrally formed.

* * * * *

UNITED STATES PATENT AND TRADEMARK OFFICE
CERTIFICATE OF CORRECTION

| | |
|---|---|
| PATENT NO. | : 7,354,511 B2 |
| APPLICATION NO. | : 11/169844 |
| DATED | : April 8, 2008 |
| INVENTOR(S) | : Marion Becker |

Page 1 of 1

It is certified that error appears in the above-identified patent and that said Letters Patent is hereby corrected as shown below:

On The Title Page, Item

(75) Assignee: Delete "Jungheiurich" and insert -- Jungheinrich --

Signed and Sealed this

Nineteenth Day of August, 2008

JON W. DUDAS
*Director of the United States Patent and Trademark Office*